United States Patent [19]

Feight

[11] 4,313,567

[45] Feb. 2, 1982

[54] CAM-LOCK ROCKET SECURING MECHANISM

[75] Inventor: Robert A. Feight, Canoga Park, Calif.

[73] Assignee: Rockwell International Corporation, El Segundo, Calif.

[21] Appl. No.: 99,675

[22] Filed: Dec. 3, 1979

[51] Int. Cl.³ .............................................. F02K 1/09
[52] U.S. Cl. .................................. 239/265.33; 52/67; 244/3.3
[58] Field of Search ........................... 244/3.3; 60/271; 74/89.15; 285/302, DIG. 13; 239/265.11, 265.19, 265.33; 52/67

[56] References Cited

U.S. PATENT DOCUMENTS 3,555,748  1/1971  Herman .................................. 52/67
3,951,342  4/1976  Baker, Jr. ........................ 239/265.33

Primary Examiner—Andres Kashnikow
Attorney, Agent, or Firm—H. F. Hamann; Harry B. Field

[57] ABSTRACT

A retractable nozzle assembly for a rocket has an extendable nozzle section which is concentric with the main nozzle and is movable telescopically from a retracted position to an extended position. A drive assembly moves the nozzle section into the extended position in which it forms an extension of the main nozzle. Cam members, movable by the same drive assembly after the nozzle is moved to its extended position, wedge detent members radially into a detent groove, providing a positive lock between the two nozzle sections.

12 Claims, 7 Drawing Figures

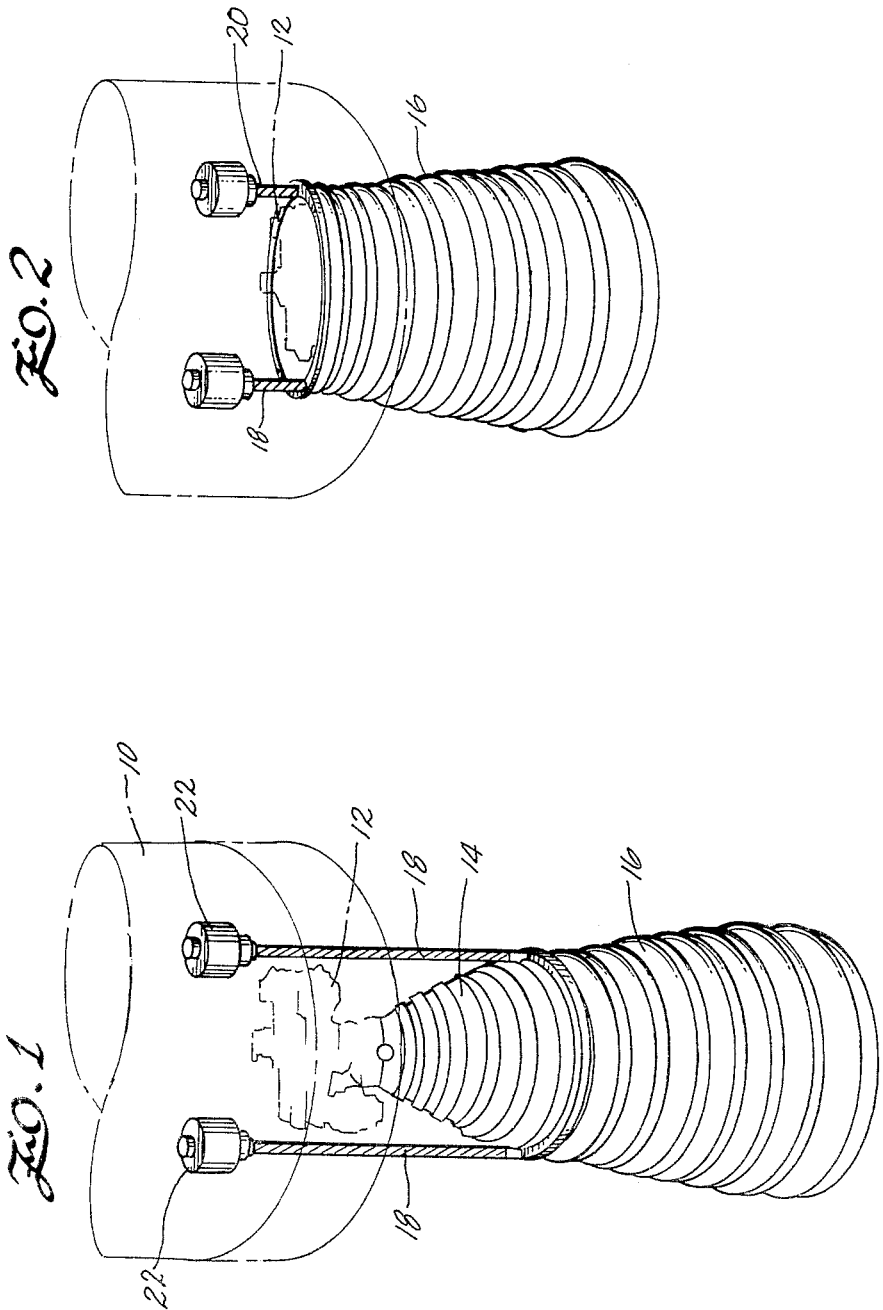

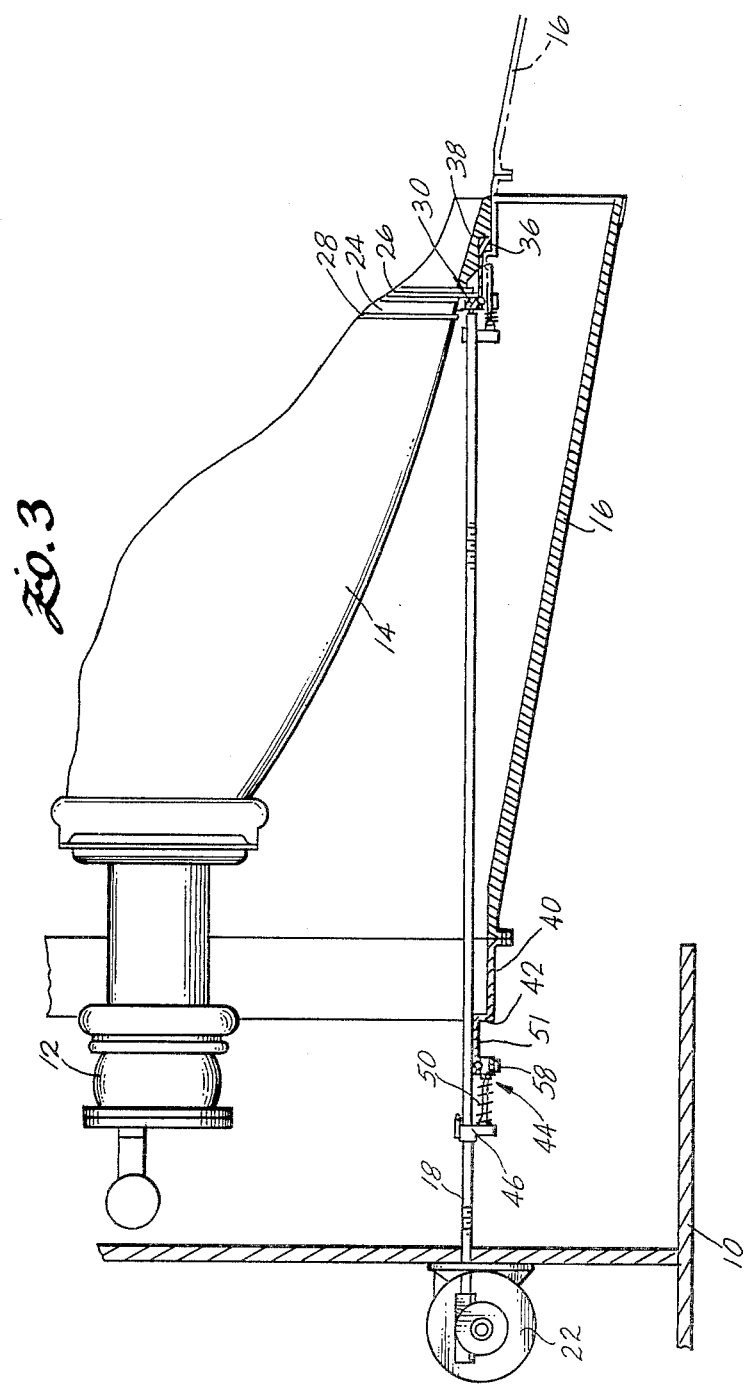

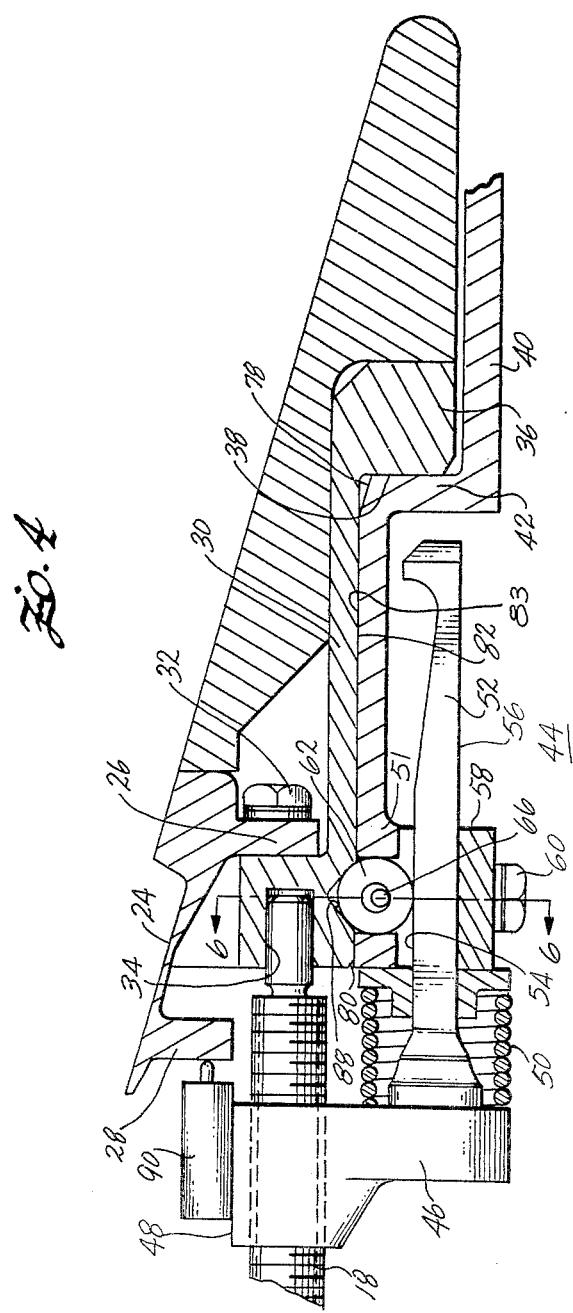

4,313,567

CAM-LOCK ROCKET SECURING MECHANISM

FIELD OF THE INVENTION

This invention relates to nozzles for rocket engines and, more particularly, to a nozzle which can be extended or retracted in length when the rocket is deployed in space.

BACKGROUND OF THE INVENTION

It is well known that increasing the area ratio of a rocket engine nozzle can increase the amount of thrust which is produced using the same amount of fuel. However, various design factors limit the area ratio of a nozzle which can be readily accommodated. One of these factors is a limit to the overall nozzle length. One solution has been to provide an extendible nozzle which allows the nozzle length to be increased when the vehicle on which the rocket is mounted is deployed in space and letting the nozzle be retracted when the vehicle is stored or in stowed position.

The concept of an extendible nozzle is not new, one such arrangement, for example, being described in U.S. Pat. No. 3,951,342 in which a plurality of elongated petals are hinged to the exit portion of the main nozzle to form an extended nozzle section when rotated outwardly. However, such known extendible nozzle arrangements have suffered from one or more of the following problems, namely, they have entailed complex mechanisms for extending and retracting the nozzle, such mechanisms have been bulky and heavy or have not been sufficiently rugged to insure reliability under transfer loads, during gimbaling of the rocket engine, or buffeting of the vehicle. Also they have required complicated controls and sensing devices to deploy the nozzle extension and insure that it is locked in place.

SUMMARY OF THE INVENTION

The present invention is directed to an improved mechanism for transporting an extendible nozzle to the deployed position and to latch securely the extended nozzle unit in position. The mechanism is self-actuating, thus eliminating the need for any complicated control and sensing devices. The deploying and latching is accomplished without imposing any severe cumulative tolerance problems. The mechanism is characterized by simplicity of design, light weight and ease of fabrication.

These and other advantages of the present invention are achieved by providing a rocket nozzle assembly having an outer extendible nozzle section which is moved concentrically in telescoping fashion relative to the main nozzle section in an axial direction by transport screws that move the outer nozzle section axially into engagement with a lip on the outer edge of the main nozzle. After engagement, further rotation of the transport screws drives latching cams into wedging engagement with latch rollers, moving the rollers radially into detent grooves. Reversing the screws releases the rollers and allows the extended outer nozzle section to be retracted.

BRIEF DESCRIPTION OF THE DRAWINGS

For a more complete understanding of the invention, reference should be made to the accompanying drawings, wherein:

FIG. 1 is a perspective view of the nozzle assembly with the outer nozzle extended;

FIG. 2 is a perspective view of the nozzle assembly with the outer nozzle retracted;

FIG. 3 is a partial view in cross-section of the nozzle assembly;

FIG. 4 is a detailed cross-sectional view of the latch mechanism in the engaged position;

DETAILED DESCRIPTION

Figure 5:
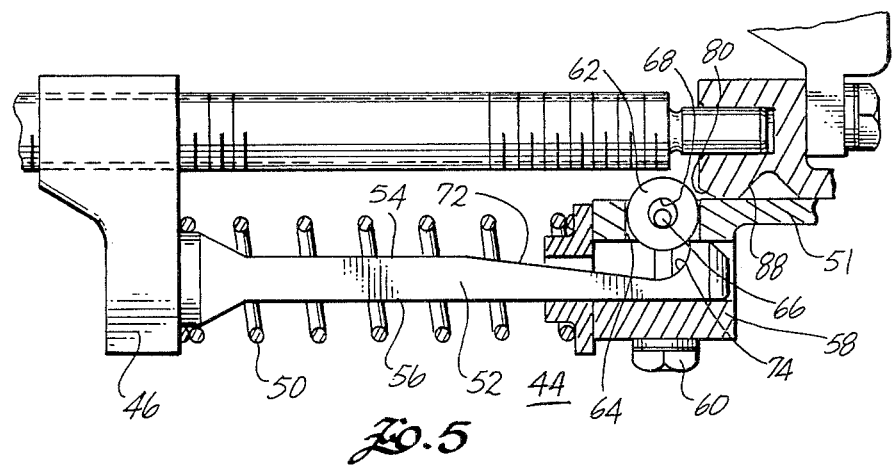
FIG. 5 is a detailed cross-sectional view of the latch mechanism in the disengaged position.

Referring to FIGS. 1 and 2, the numeral 10 indicates generally a conventional rocket vehicle having an engine 12 with a fixed main nozzle 14. An outer extendible nozzle section 16, concentric with the main nozzle 14, moves between an extended position as shown in FIG. 1 and a retracted position as shown in FIG. 2. In the retracted position, the outer nozzle section 16 is drawn partially into the rear of the rocket vehicle 10 around the rocket engine 12. The outer nozzle section 16 is extended and retracted by transport screws 18 that are motor driven by suitable drive means, indicated at 22, mounted within the rocket vehicle 10. While two such transport screws are shown in FIGS. 1 and 2 for clarity, three such screws spaced at 120° around the circumference of the nozzle are preferred to give balanced support. The multiple transport screws can be driven from a single motor through a suitable drive transmission to ensure that they all rotate in synchronism, or the screws may be rotated by separate motors which are synchronized.

Referring to FIG. 3, the outer edge of the main nozzle 14 includes a ring 24 having a pair of radially projecting annular flanges 26 and 28. The drive assembly for the outer nozzle section 16 includes an annular mounting member 30 which is bolted or otherwise secured to the flange 26, as by bolts 32, as shown in detail in FIG. 4. The mounting member 30 has bores 34 for journaling the ends of the transport screws 18. The mounting member 30 terminates at its outer periphery in a flange or lip 36 having a stop surface 38.

The outer nozzle section 16 is attached to a supporting collar 40 having a shoulder 42 which is moved into abutting relationship with the stop surface 38 when the outer nozzle section is moved to the fully extended position, as shown in detail in FIG. 4. The collar 40 is movably supported on the transport screws 18 by lead nut and latching assemblies, one of which is indicated generally at 44. The assembly 44 includes a supporting bracket 46 which has a threaded bore 48 engaging the lead screw 18. Thus, as each of the lead screws 18 is rotated, the bracket 46 moves the assembly 44 and the outer nozzle 16 in an axial direction between the retracted and extended positions. Translational movement is imparted to the collar 40 through the latch mechanism 44 by a spring 50 extending along an axis parallel to the axis of motion imparted by the transport screws 18. The spring 50 of each assembly 44 extends between the bracket 46 and an associated supporting arm 51 integral with and projecting from the collar 40.

Figures 6, 7:
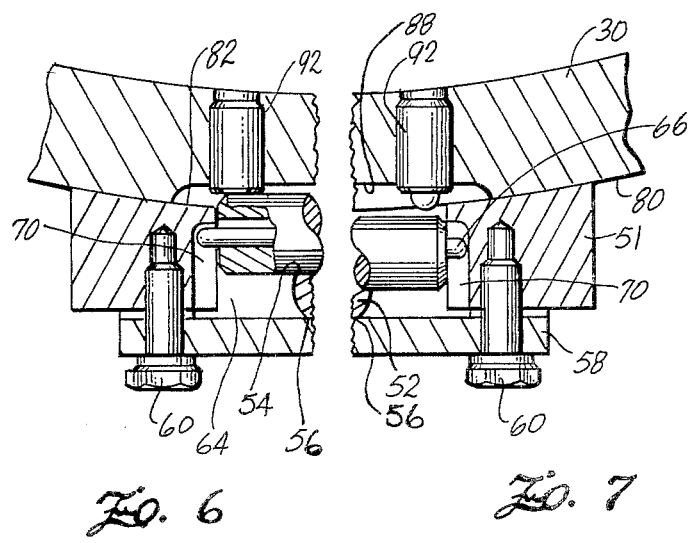
FIG. 6 is a detailed sectional view taken substantially on the line 6—6 of FIG. 4 and showing the latch in the engaged condition.
FIG. 7 is a view, similar to that of FIG. 6, showing the latch in the disengaged condition.

As best shown in FIG. 5, the spring 50 in each of the latch assemblies 44 is normally held in a state of compression by a latch member 52 which is rigidly mounted on the bracket 46 and extends through the center of the compression spring 50. As seen in FIG. 6, the latch member 52 is formed with a pair of parallel flat surfaces 54 and 56. The surface 56, at the outer end of the latch member 52, slidably engages a retaining plate 58 which is bolted or otherwise secured to the arm 51 as by a pair of bolts 60. The flat surface 54 engages the cylindrical surface of a detent roller 62 which is movable radially in an elongated radially extending slot 64 in the arm 51. The roller 62 is retained radially in the slot 64 by a pin 66 extending through an axial bore 68 through the roller 62. The ends of the pins 66 extend beyond the ends of the roller into radial guide grooves 70 along the margins of the slot 64. The flat surface 54 on the latch member 52 is inclined along a portion 72 of its length relative to the surface 56 and then curves outwardly abruptly at the outer end, as indicated at 74. Thus, as the latch member 52 moves relative to the collar 40 and the roller 62, the roller is moved radially by the camming action of the surface 72. As the spring 50 moves the latching member and the collar 40 apart, the outer end surface 74 moves the roller 62 to its extreme radial position in which the pin 66 engages the ends of the guide grooves 70. In this position, further movement of the latch member 52 away from the collar 40 is prevented by the roller 62, retaining the spring 50 in a state of compression.

When the motor drive 22 is energized, rotating the feed screws 18, the brackets 46 are moved from the retracted position shown in FIG. 3 toward the extended position, shown in broken lines in FIG. 3. As the fully extended position is approached, a chamfered surface 78 comes into engagement with the chamfered edge 80 on the outer edge of the arm 51, thus bringing the convex cylindrical surface 82 of the mounting member 30 into sliding engagement with the concave cylindrical surface 83 of the collar 40. The collar 40 of the outer nozzle section is thereby accurately positioned radially with respect to the main nozzle section 14. When the shoulder 42 comes into engagement with the stop surface 38, the axial position of the outer nozzle section is fixed relative to the main nozzle 14.

As the lead screws 18 continue to advance the bracket 46, the spring 50 is compressed, allowing the camming surface 72 to move the roller 62 in a radial direction into engagement with a V-shaped detent groove 88 in the mounting member 30. As the spring 50 continues to be compressed, the roller moves along the parallel portion of the surface 54 until the bracket 46 moves a limit switch 90 into engagement with the flange 28. The limit switch operates to interrupt the drive 22 and stop the lead screws 18. It will be noted that the position of the bracket 46 when the drive 22 is interrupted is not critical to the latching operation because the surface 54 is parallel to the axis of motion of the latch member 52. The latch assembly 44 provides a positive positive locking mechanism by virtue of the retention of the roller 62 in the detent groove 88 by the latch member 52 and the guide plate 58.

It will be seen that the outer nozzle section 16 can be retracted merely by reversing the direction of the drive 22. As the compression on the spring 50 is relieved and the latch member 52 moved relative to the roller 62, the roller 62 is forced out of the detent groove 88 by spring operated plungers 92 which are mounted at the base of the groove 88 in the mounting member 30.

From the above description, it will be seen that an extendible rocket nozzle assembly has been provided which is operated by a simple lead screw-type drive mechanism, yet provides positive radial and axial positioning of the extended nozzle section as well as a positive locking arrangement capable of transferring axially directed thrust loads between the extended nozzle and the main vehicle frame.

It is to be understood that what has been described is merely illustrative of the principles of the invention and that numerous arrangements in accordance with this invention may be devised by one skilled in the art without departing from the spirit and scope thereof.

What is claimed is:

1. An extendible rocket engine nozzle, comprising:
   a main nozzle;
   an outer nozzle section concentric with the main nozzle;
   means secured to the main nozzle for moving the outer nozzle section in an axial direction relative to the main nozzle between a retracted position and an extended position;
   stop means engaged by the outer nozzle for positioning said outer nozzle in fixed relation to said main nozzle when the outer nozzle is moved to the extended position;
   latching means for locking the nozzles together when the outer nozzle is moved to the extended position, including a catch member secured to the outside of the main nozzle having a recessed surface, means supported on the outer nozzle including a roller detent member in rolling contact with the catch member when the outer nozzle is moved to the extended position, the roller detent member engaging said recessed surface when the stop means is engaged by the outer nozzle, and a movable cam member having a wedging surface engaging the detent member for wedging the member into the recessed surface when the cam is moved to a locking position.

2. Apparatus of claim 1 further including spring means urging the cam member away from the locking position.

3. Apparatus of claim 2 wherein said means for moving the outer nozzle includes means secured to the cam member for moving the cam member to the locking position against the urging of said spring means.

4. Apparatus for driving two concentric telescoping members between retracted and extended positions along a common axis, comprising:
   a drive member;
   drive means for moving the drive member along a linear path parallel to said axis between said retracted and extended positions;
   means including a spring yieldably connecting the drive member to a first one of the telescoping members for moving the first telescoping member relative to the other telescoping member;
   stop means limiting the movement of the first telescoping member relative to the other telescoping member when in the extended position, the spring allowing continued relative movement between the drive member and said first telescoping member after engaging the stop means; and
   latching means operated by said continued movement of the drive member after the stop means is engaged for locking the two telescoping members together.

5. Apparatus of claim 4 wherein said latching means includes:

a cam member connected to and movable with the drive member;

detent means carried by said first telescoping member and engaging a recessed surface in the other telescoping member when the stop means is engaged; and means activated by the cam member for engaging and disengaging the detent means and the recessed surface in response to the relative movement between the drive member and said first telescoping member.

6. Apparatus of claim 5 wherein the cam member has a cam surface engaging the detent means, the cam surface extending at an angle to said axis of movement; and means guiding the detent means along a path relative to the first telescoping member that is transverse to said axis of movement.

7. Apparatus of claim 6 wherein the detent means is a roller.

8. Apparatus of claim 7 further including spring means engaging said roller for urging the roller toward the cam surface.

9. A retractable nozzle assembly comprising:

a fixed nozzle;

an outer nozzle extending concentrically around and movable axially relative to the fixed nozzle;

stop means on one of the nozzles engaging the other nozzle when the outer nozzle is moved to an extended position relative to the fixed nozzle;

means movably supporting the outer nozzle relative to the fixed nozzle including a plurality of drive members movable in a direction parallel to the axis of movement of the outer nozzle;

spring means yieldably connecting the drive members to the outer nozzle for moving the outer nozzle relative to the fixed nozzle, the spring means allowing the drive members to move relative to the outer nozzle when movement of the outer nozzle is interrupted by the stop means;

latch means mounted on the outer nozzle for engaging the fixed nozzle; and means responsive to relative movement between the drive members and the outer nozzle for actuating the latch means to secure the outer nozzle to the fixed nozzle.

10. Apparatus of claim 9 wherein the latch means includes:

a cam member projecting from each of the drive members;

detent means on the outer nozzle, the cam member having a cam surface engaging the detent means, the detent means being urged into engagement with the fixed nozzle by relative movement of the cam member in one direction.

11. Apparatus of claim 10 further including means for releasing the detent means with movement of the cam member in the opposite direction.

12. Apparatus of claim 9 wherein the means movably supporting the outer nozzle includes a plurality of lead screws, means rotatably supporting the lead screws on the fixed nozzle with the lead screws spaced around the outside of the fixed nozzle, the drive members threadedly engaging the lead screws, and means rotating the lead screws to advance the drive members lengthwise of the lead screws.

* * * * *